(12) United States Patent
Goehring et al.

(10) Patent No.: US 9,809,106 B2
(45) Date of Patent: Nov. 7, 2017

(54) HYBRID VEHICLE WITH INTERNAL COMBUSTION ENGINE AND ELECTRIC MACHINE

(71) Applicant: Dr. Ing. h.c.F. Porsche Aktiengesellschaft, Stuttgart (DE)

(72) Inventors: Markus Goehring, Nufringen (DE); Martin Roth, Rutesheim (DE); Werner Huefner, Tiefenbronn (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 15/433,515

(22) Filed: Feb. 15, 2017

(65) Prior Publication Data

US 2017/0158045 A1    Jun. 8, 2017

Related U.S. Application Data

(63) Continuation-in-part of application No. 14/244,101, filed on Apr. 3, 2014, now abandoned.

(30) Foreign Application Priority Data

Apr. 3, 2013    (DE) .......................... 10 2013 103 305

(51) Int. Cl.
*B60K 6/52* (2007.10)
*B60K 6/387* (2007.10)
(Continued)

(52) U.S. Cl.
CPC ............... *B60K 6/52* (2013.01); *B60K 6/387* (2013.01); *B60K 6/40* (2013.01); *B60K 6/48* (2013.01);
(Continued)

(58) Field of Classification Search
CPC ............... B60K 5/42; B60K 5/50; B60K 5/52
See application file for complete search history.

(56) References Cited

U.S. PATENT DOCUMENTS 6,059,059 A * 5/2000 Schmidt-Brucken . B60W 10/02
180/65.23
8,439,147 B2 * 5/2013 Fuechtner ................ B60K 1/04
180/243
(Continued)

FOREIGN PATENT DOCUMENTS

CN    201784620 U    4/2011
CN    102762400 A    10/2012
(Continued)

OTHER PUBLICATIONS

German Search Report dated Dec. 18, 2013.
(Continued)

*Primary Examiner* — John Walters
*Assistant Examiner* — James Triggs
(74) *Attorney, Agent, or Firm* — Gerald E. Hespos; Michael J. Porco; Matthew T. Hespos

(57) ABSTRACT

A hybrid vehicle (1) has an internal combustion engine (2), an electric machine (3) and a transmission (4) for driving a rear axle (5) of the vehicle (1). The internal combustion engine (2) and the electric machine (3) are assigned a common input shaft (6) of the transmission (4). The internal combustion engine (2), the electric machine (3) and a traction battery (19) for the electric machine (3) or a tank for the internal combustion engine (2) are arranged in a rear region of the vehicle (1), transversely with respect to the direction of travel. The electric machine power is greater than the power of the internal combustion engine (2). A high level of electrification of the hybrid drive is possible with optimum utilization of space in the vehicle.

10 Claims, 4 Drawing Sheets

(51) Int. Cl.
*B60K 6/40* (2007.10)
*B60K 6/48* (2007.10)

(52) U.S. Cl.
CPC ....... *B60Y 2200/92* (2013.01); *B60Y 2400/82* (2013.01); *Y10S 903/914* (2013.01); *Y10S 903/916* (2013.01); *Y10S 903/951* (2013.01)

(56) References Cited

U.S. PATENT DOCUMENTS

| | | | |
|---|---|---|---|
| 8,640,800 B2 * | 2/2014 | Armbruster | B60K 7/0007 180/65.6 |
| 9,073,546 B2 | 7/2015 | Kuroda et al. | |
| 2007/0137906 A1 | 6/2007 | Seminara et al. | |
| 2009/0014221 A1 | 1/2009 | Kim et al. | |
| 2011/0259657 A1 * | 10/2011 | Fuechtner | B60K 6/52 180/65.21 |
| 2012/0165149 A1 | 6/2012 | Morimoto | |
| 2013/0066499 A1 | 3/2013 | Niste et al. | |
| 2013/0096761 A1 | 4/2013 | Kuroda et al. | |
| 2013/0110379 A1 | 5/2013 | Yamamoto et al. | |
| 2015/0336561 A1 | 11/2015 | Kuroda et al. | |

FOREIGN PATENT DOCUMENTS

| | | |
|---|---|---|
| CN | 102991331 A | 3/2013 |
| DE | 102007054357 A1 | 1/2009 |
| DE | 102007044526 A1 | 3/2009 |
| DE | 102010017966 A1 | 10/2011 |
| DE | 102011089670 A1 | 6/2012 |
| DE | 102011000609 A1 | 8/2012 |
| DE | 102011002309 A1 | 10/2012 |
| DE | 102011088647 A1 | 6/2013 |
| JP | H07315058 A | 12/1995 |
| JP | H10259746 A | 9/1998 |
| JP | H11208304 A | 8/1999 |
| JP | 2004-10-28 A | 10/2004 |
| JP | 2006044649 A | 2/2006 |
| JP | 2008155830 A | 7/2008 |
| JP | 2011201387 A | 10/2011 |
| JP | 2012021425 A | 2/2012 |
| WO | 2011158882 A1 | 12/2011 |

OTHER PUBLICATIONS

Korean Office Action.
Chinese Office Action dated Jan. 18, 2016.
Japanese Office Action dated Feb. 26, 2017.

* cited by examiner

HYBRID VEHICLE WITH INTERNAL COMBUSTION ENGINE AND ELECTRIC MACHINE

CROSS REFERENCE TO RELATED APPLICATION

This application is a continuation-in-part of U.S. patent application Ser. No. 14/244,101, filed Apr. 3, 2014, which claims priority under 35 USC 119 to German Patent Appl. No. 10 2013 103 305.9 filed on Apr. 3, 2013, the entire disclosure of which is incorporated herein by reference.

BACKGROUND

1. Field of the Invention

The invention relates to a hybrid vehicle having an internal combustion engine, at least one electric machine and a transmission for driving a rear axle of a vehicle. The internal combustion engine and one electric machine are assigned a common input shaft of the transmission.

2. Description of the Related Art

A parallel hybrid vehicle has an internal combustion engine and an electric machine that act on a common drivetrain. Forces or torques of the internal combustion engine and the electric machine can be available simultaneously.

DE 10 2011 000 609 A1 discloses a parallel hybrid vehicle where the internal combustion engine, the electric machine and the transmission are installed in the longitudinal direction of the vehicle. The internal combustion engine is arranged in front of the electric machine, and the electric machine is arranged in front of the transmission. An extremely large structural space in the longitudinal direction of the vehicle is required proceeding forward from the rear axle due to the longitudinal arrangement of said assemblies. A further electric machine is provided for driving the wheels of a front axle of the vehicle.

US 2007/0137906 A1 describes a parallel hybrid vehicle where an axle that has two wheels is assigned a drivetrain that is arranged parallel to the axle and thus transverse to the direction of travel. The drivetrain is formed by an internal combustion engine, an electric machine and the transmission. The electric machine is connected via an energy converter to a traction battery.

DE 10 2007 044 526 A1 discloses a hybrid vehicle in the form of an industrial truck with a drive arranged transverse to the direction of travel. The drive assemblies are arranged between a front axle and a rear axle of the vehicle, and a traction battery is positioned behind the drive assemblies, and thus between the drive assemblies and the rear axle.

It is an object of the present invention to further develop a hybrid vehicle so that a high level of electrification of the hybrid drive is possible with optimum utilization of the structural space of the vehicle.

SUMMARY OF THE INVENTION

The invention relates to a hybrid vehicle where the internal combustion engine, an electric machine and a traction battery for the electric machine or a tank for the internal combustion engine are arranged in a rear region of the vehicle, transversely with respect to the direction of travel, and wherein the electric machine power is greater than the power of the internal combustion engine.

The hybrid vehicle preferably is a sports car, namely a two-passenger sports car.

The transverse arrangement of the drivetrain results in a relatively large free structural space in the rear-end region, in particular in relation to known rear-engine sports cars with large internal combustion engine. The free structural space can be utilized for the relatively large electrical traction battery or for the tank if the traction battery is arranged in the front end of the vehicle. The unit composed of electric machine and internal combustion engine can be made extremely compact by having the electric machine power be greater than the power of the internal combustion engine. A sports car normally is driven by a large-displacement 6-cylinder or 8-cylinder engine. However, the hybrid sports car of the invention can use a small internal combustion engine, for example a 3-cylinder engine or compact 4-cylinder engine. The one electric machine is arranged in the structural space thus obtained in the rear-end region of the motor vehicle.

It is thus possible to resort to considerably cheaper and lower-powered conventional internal combustion engine drivetrains from front-wheel-drive mass-production vehicles or mass-production vehicle construction sets.

The internal combustion engine or the transverse installation may be in a horizontal arrangement. Thus, a low center of gravity is obtained, which is beneficial for a sports car. This also results in additional structural space above the transverse installation. It is also possible for the internal combustion engine or the transverse installation to be positioned in an arrangement that deviates from the horizontal arrangement. For example, the transverse installation could be provided in a vertical arrangement. An arrangement is also conceivable in which the installation position is inclined obliquely so that the engine is not in a horizontal plane parallel to the contact plane of the wheels, but in a plane arranged at an acute angle to the horizontal plane.

A further electric machine may be arranged in the front region of the vehicle for driving the front axle of the vehicle. The hybrid vehicle may be an all-wheel-drive vehicle having a hybrid drive for the rear axle and a purely electric drive for the front axle.

The further electric machine preferably is arranged in front of the front axle for reasons of weight distribution, efficiency and traction.

The vehicle has a traction battery for the further electric machine. The traction battery preferably is assigned both to the further electric machine and also to the electric machine that is arranged in the region of the rear axle of the vehicle.

The traction battery may be in the region of the rear axle of the vehicle, and preferably in front of the rear axle and in front of the internal combustion engine. The traction battery alternatively may be in the front end of the vehicle.

A tank for fuel for the operation of the internal combustion engine preferably is above the further electric machine in the front end of the vehicle or in front of the internal combustion engine in the rear region of the vehicle.

The traction battery can be charged by a connection to a fixed power supply network (plug-in hybrid).

The invention thus provides a hybrid vehicle, in particular a hybrid sports car, that can be constructed using mass-production drivetrains. This solves the problem that, specifically in the case of the hybridization of sports cars, there is a considerable structural space deficit because, aside from an internal combustion engine with tank and exhaust system, it is also necessary for an electric drive, traction battery and charging unit to be accommodated in a small structural space. The high level of installed electrical power provided in the hybrid vehicle makes it possible for the internal combustion engine to be decreased in size without a resulting driving performance disadvantage in relation to conventionally driven vehicles. Here, it is possible to resort to considerably cheaper and lower-powered conventional internal combustion engine drivetrains from front-wheel-drive mass-production vehicles or mass-production vehicle construction sets. For example in the case of a sports car that conventionally is driven by a large-displacement cylinder-type engine, it is possible in the case of the hybrid-driven variant to change to a small, mass-production vehicle drivetrain and to compensate the power deficit by a high-powered electric machine in the structural space thus gained.

The installation space gained in front of the drivetrain provides sufficient space for a large traction battery in front of the rear axle. Thus, large required traveling ranges of the vehicle can be realized.

The tank can be arranged in the front end of the vehicle above the further electric machine and, while maintaining the same traveling range, can be smaller than in a conventional vehicle. The luggage compartment volume in the front end of the vehicle and in the rear end of the vehicle substantially can be maintained with this arrangement.

Those components that are most critical in the event of a crash, specifically the traction battery and fuel tank, are situated outside the immediate deformation zones.

The entire drive concept can be implemented inexpensively on the basis of existing mass-production vehicles, with few corresponding bodyshell modifications.

Further features of the invention will emerge from the appended drawings and from the description of the preferred exemplary embodiment depicted in the drawings, without the invention being restricted to the exemplary embodiment.

BRIEF DESCRIPTION OF THE DRAWINGS

FIG. 1A shows the hybrid vehicle according to the invention, which is in the form of a sports car, in a schematic illustration as viewed from above, while

FIG. 2A shows a three-dimensional view of the vehicle body of the hybrid vehicle, for the rear-end region and the floor assembly assigned to the vehicle passenger compartment and includes a hybrid drive rearward of the passenger compartment, while

DETAILED DESCRIPTION OF THE PREFERRED EMBODIMENTS

Figure 1A:
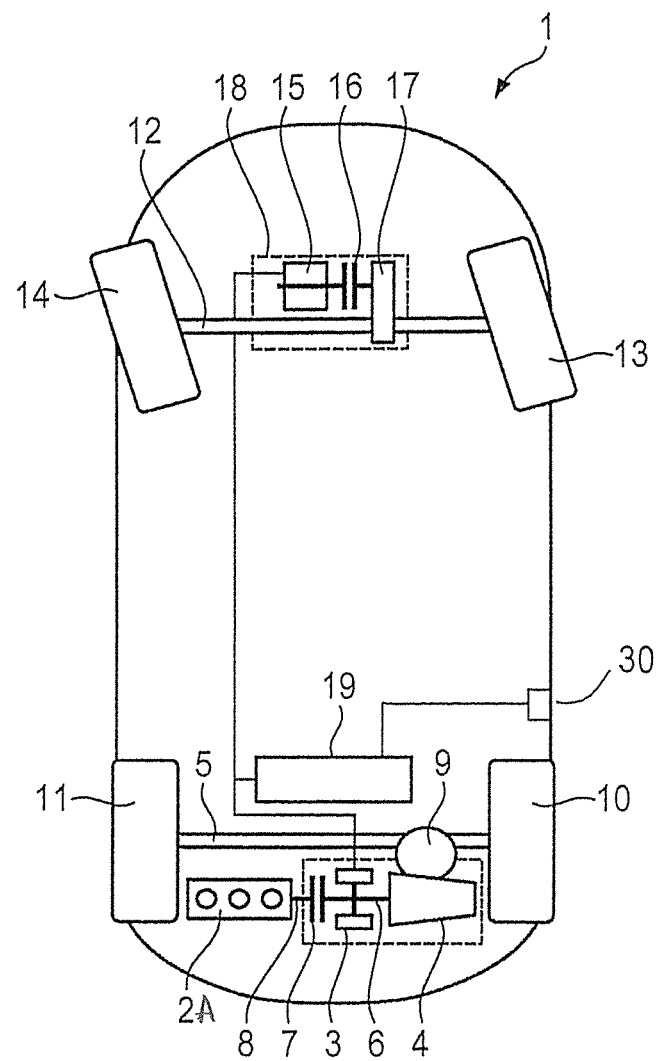

FIG. 1A illustrates a first vehicle 1A, which is a hybrid vehicle 1A having a body 20, an internal combustion engine 2A, an electric machine 3 and a transmission 4 for driving a rear axle 5 of the vehicle 1A. The internal combustion engine 2 and the electric machine 3 are assigned to a common input shaft 6 of the transmission 4. The input shaft 6 extends through the electric machine 3 and can be connected to a crankshaft 8 of the internal combustion engine 2A by means of a clutch 7. The transmission 8 is connected to the rear axle 5 via a differential 9. The rear axle 5 is assigned to a right rear wheel 10 and a left rear wheel 11 of the hybrid vehicle 1A. The assembly of the internal combustion engine 2A, the electric machine 3 and the transmission 4 are rearward of the rear axle 5 of the vehicle 1A.

A front axle 12 is assigned steerable front wheels 13 and 14. A further electric machine 15 is mounted in front of the front axle 12 and can be connected in non-positively locking fashion to the front axle 12 via a clutch 16 and a transmission 17. A tank 18 is arranged above the electric machine 15.

A traction battery 19 is installed in the region of the rear axle 5 of the vehicle 1 and is aligned transverse to the direction of travel. In this case the traction battery 19 is arranged in front of the rear axle 5.

The maximum power of the first electric machine is approximately 90 kW and the maximum power of the second electric machine also is approximately 90 kW. Furthermore, the maximum power of the internal combustion engine 2 is approximately 160 kW, in particular 162 kW. Such a level of power is generated for example by a 4-cylinder internal combustion engine with a displacement of 1.4 l. The tank 18 for accommodating fuel for the internal combustion engine 2 is arranged in the region of the front axle 12 and thus in the region of the one electric machine 15. The tank 18 has a volume of approximately 45 l.

The electric machine power, and thus the power of the two electric machines 3, 15, is thus greater than the power of the internal combustion engine 2A.

The internal combustion engine 2A preferably is substantially horizontal. Thus, the drivetrain formed from the internal combustion engine 2A, the electric machine 3 and the transmission 4 has a low center of gravity, with performance advantages for the sports car. The internal combustion engine 2A takes up less structural space than the electric machine 3. The transverse arrangement of the drivetrain yields a relatively large free structural space in the rear-end region, with the structural space being utilized for the relatively large electric traction battery 19.

Figure 2A:
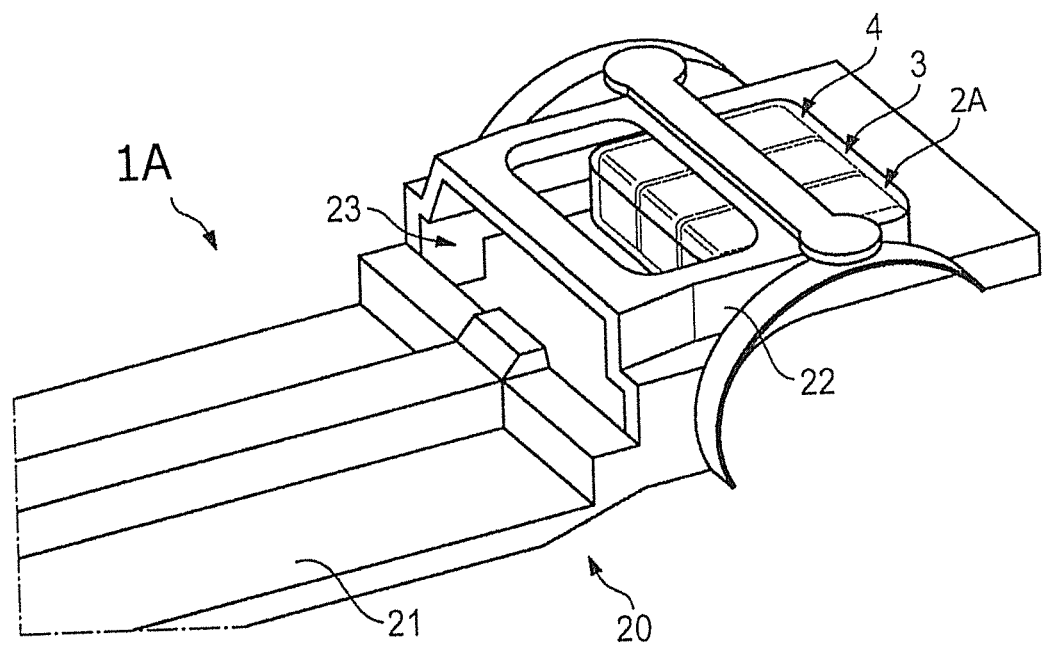

FIG. 2A illustrates a sub-region of the body 20 of the hybrid vehicle 1A that includes a floor 21 of the passenger compartment and a rear body region 22 of the hybrid vehicle 1A. The drivetrain that has the internal combustion engine 2A, the electric machine 3 and the transmission 4 is very far rearward in the hybrid vehicle 1A, and more particularly, rearward of the rear axle 5. Thus, there is free structural space 23 in front of this drivetrain to accommodate the transversely positioned traction battery 19 or a fuel tank. The traction battery 19 is arranged in the region of the front axle if the fuel tank is in the region 23.

The hybrid vehicle 1A also can have a connection to the fixed power supply network (plug-in), as indicated by the plug-in socket 30 in FIG. 1.

Figure 1B:
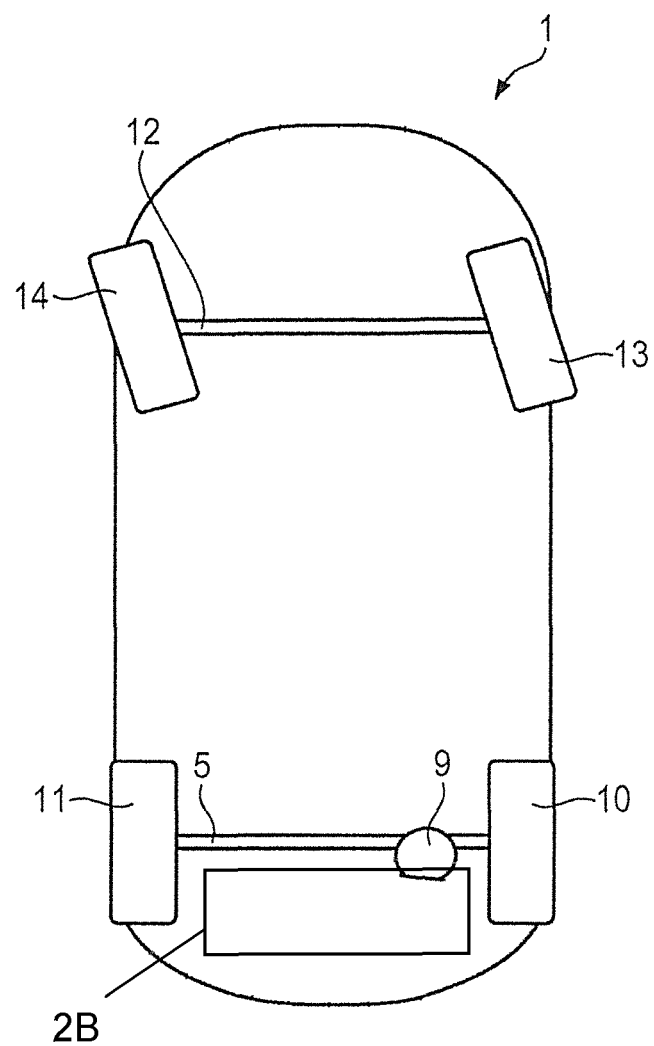
FIG. 1B shows the same vehicle body provided with a conventional drive having only an internal combustion engine.
Figure 2B:
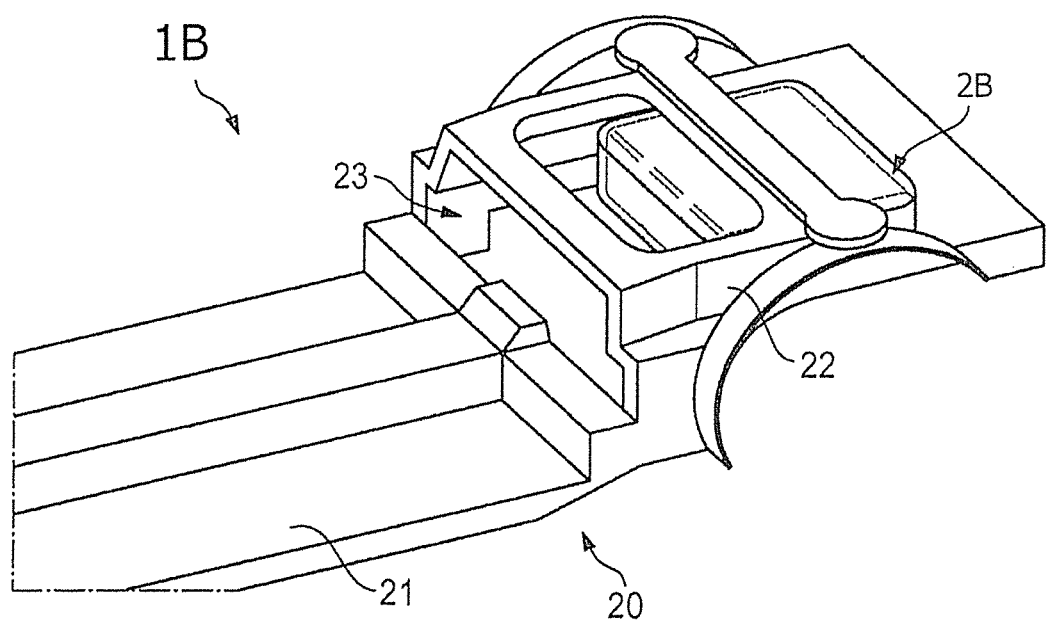
FIG. 2B shows the same vehicle body provided with a conventional drive having only an internal combustion engine.

FIGS. 1B and 2B, on the other hand, illustrate a second vehicle 1B with the same body 20 as the first vehicle 1A of FIGS. 1A and 2A, which is the above-described hybrid vehicle 1A. However, the second vehicle 1B with the body 20 is equipped with an internal combustion engine 2B as an exclusive source of power for driving the vehicle 1B. Hence the second vehicle 1B has no electric machine 3, 15 and no traction battery 19. The internal combustion engine 2B is much larger than the internal combustion engine 2A, and the internal combustion engine 2B occupies substantially the same space as the internal combustion engine 2A, the electric machine 3 and the transmission 4, specifically a position rearward of the rear axle 5.

What is claimed is:

1. First and second vehicles comprising: substantially identical bodies, a rear axle for driving rear wheels of the respective vehicle, a front axle connected to steerable front wheels of the respective vehicle, a passenger compartment between the front and rear axles of the respective vehicle, an engine compartment of a specified size and in a specified region in proximity to the rear axle of the respective vehicle, and a luggage compartment of a specified volume in proximity to the front axle of the respective vehicle, wherein the first vehicle further comprises:
a first drive having a first internal combustion engine disposed in the engine compartment and configured for driving the rear axle of the first vehicle as an exclusive source of power for driving the first vehicle; and
the second vehicle comprises:
  a hybrid module disposed in the engine compartment of the second vehicle, the hybrid module having a second internal combustion engine, at least one rear electric machine and a transmission for driving the rear axle of the second vehicle, the second internal combustion engine and the at least one rear electric machine being connectable to a common input shaft of the transmission, the second internal combustion engine, the at least one rear electric machine and the transmission being arranged transverse to a direction of travel of the second vehicle and being disposed rearward of the rear axle;
  a front drive unit including at least one front electric machine arranged in front of the front axle of the second vehicle and being selectively connectable to the front axle of the second vehicle via a clutch and a front transmission for driving the front axle of the second vehicle; and
  an energy store for the electric machines, the energy store having a width dimension arranged transverse to the direction of travel and a length dimension transverse to the width dimension and shorter than the width dimension, the energy store being forward of the rear axle of the second vehicle and at least partly between rear wheels of the second vehicle, and wherein
  a combined power of the front and rear electric machines is greater than power of the second internal combustion engine.

2. The first and second vehicles of claim 1, wherein each of the vehicles is a two-passenger sports car.

3. The first and second vehicles of claim 1, wherein the second internal combustion engine takes up less space than the rear electric machine.

4. The first and second vehicles of claim 3, wherein the second internal combustion engine is arranged substantially horizontally.

5. The first and second vehicles of claim 3, wherein the first internal combustion engine is a 6-cylinder or 8-cylinder engine and the second internal combustion engine is a 3-cylinder engine or a 4-cylinder engine.

6. The first and second vehicles of claim 1, wherein energy store is a traction battery for the rear and front electric machines.

7. The first and second vehicles of claim 6, wherein the first vehicle further comprises a tank for fuel for operating the second internal combustion engine, the tank being arranged above the front electric machine.

8. The first and second vehicles of claim 6, wherein the traction battery is configured to be charged by connection to a fixed power supply network.

9. The first and second vehicles of claim 1, wherein the electric machines have a combined power of approximately 180 kW and the second internal combustion engine power has a maximum power of approximately 160 kW.

10. The first and second vehicles of claim 9, wherein the power of the rear electric machine is approximately 90 kW and the power of the front electric machine is approximately 90 kW.

* * * * *